(12) United States Patent
Wang et al.

(10) Patent No.: US 12,372,712 B2
(45) Date of Patent: Jul. 29, 2025

(54) LAMP UNIT AND LAMP SYSTEM

(71) Applicant: SAVANT TECHNOLOGIES LLC, East Cleveland, OH (US)

(72) Inventors: Zhiyong Wang, Shanghai (CN); Fangru Tang, Shanghai (CN); Jing Chen, Shanghai (CN); Aijun Wang, Shanghai (CN); Liang Shan, Beijing (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 24 days.

(21) Appl. No.: 18/477,756

(22) Filed: Sep. 29, 2023

(65) Prior Publication Data

US 2024/0126007 A1 Apr. 18, 2024

(30) Foreign Application Priority Data

Oct. 14, 2022 (CN) .......................... 202211259026.9

(51) Int. Cl.
*F21V 8/00* (2006.01)

(52) U.S. Cl.
CPC .......... *G02B 6/009* (2013.01); *G02B 6/0068* (2013.01)

(58) Field of Classification Search
CPC ...... F21S 2/00; F21S 8/00; F21V 5/00; F21V 15/01; F21V 19/001; F21V 23/006; F21Y 2103/20; F21Y 2113/20; F21Y 2115/10; G02B 6/0011–0095
See application file for complete search history.

(56) References Cited

U.S. PATENT DOCUMENTS

2010/0073905 A1\* 3/2010 Hsin-Nung .......... G02B 6/0078
362/235

FOREIGN PATENT DOCUMENTS

| CN | 202221000 U | 5/2012 |
| CN | 214663959 U | 11/2021 |
| CN | 216813935 U | 6/2022 |

\* cited by examiner

*Primary Examiner* — Jason M Han (57) ABSTRACT

Provided is a lamp system and a lamp unit that includes a light-emitting plate having a first light-emitting surface, a back plate arranged opposite to the light-emitting plate, a frame portion supporting the light-emitting plate at the periphery of the light-emitting plate and the back plate, and forming a cavity between the light-emitting plate and the back plate, a light source assembly arranged in the cavity and emitting first light and second light, wherein the first light has a first light attribute and is emitted from the first light-emitting surface, the second light has a second light attribute and is emitted from a second light-emitting surface, and the second light-emitting surface is arranged at the periphery of the light-emitting plate, and at least one connection port for electrically connecting the lamp unit to another lamp unit.

17 Claims, 6 Drawing Sheets

LAMP UNIT AND LAMP SYSTEM

CROSS-REFERENCE TO RELATED APPLICATIONS

This application claims the benefit of Chinese Patent Application Serial Number 202211259026.9, filed Oct. 14, 2022, which is incorporated herein by reference.

FIELD OF TECHNOLOGY

The present disclosure relates to the field of lamps. In particular, the present disclosure relates to a lamp unit and a lamp system.

BACKGROUND

LED panel lamps can form specific light-emitting patterns (Tiles) and light-emitting effects by means of combinations in a spliced manner.

However, in the prior art, the LED panel lamps can only achieve planar light emission, and cannot achieve linear light emission, causing a single form of the light-emitting patterns formed by the LED panel lamps, and a poor light-emitting effect.

In view of this, it is desirable to provide a lamp unit and a lamp system capable of achieving linear light emission/linear light emission and planar light emission to solve the described technical problems.

SUMMARY

The purpose of the present disclosure is to provide a lamp unit and a lamp system capable of achieving linear light emission and/or planar light emission, so that the light-emitting patterns formed after the lamp units are spliced are more abundant, and the light-emitting effect of the lamp units is improved.

According to an embodiment of the present disclosure, provided is a lamp unit, comprising: a light-emitting plate having a first light-emitting surface; a back plate arranged opposite to the light-emitting plate; a frame portion supporting the light-emitting plate at the periphery of the light-emitting plate and the back plate, and forming a cavity between the light-emitting plate and the back plate; a light source assembly arranged in the cavity and capable of emitting first light and second light, wherein the first light has a first light attribute and is emitted from the first light-emitting surface, the second light has a second light attribute and is emitted from a second light-emitting surface, and the second light-emitting surface is arranged at the periphery of the light-emitting plate; and at least one connection port for electrically connecting the lamp unit to another lamp unit.

By means of the described arrangement, the lamp unit can achieve linear light emission and planar light emission, so that the light-emitting patterns formed after the lamp units are spliced are more abundant, and the light-emitting effect is improved.

In the lamp unit according to an embodiment of the present disclosure, the first light attribute and the second light attribute are the same or different, wherein the first light attribute and the second light attribute comprise at least one of a color temperature, a color, a brightness, or a characteristic of change of the color temperature, the color, the brightness or a combination thereof over time.

By enabling the first light attribute and the second light attribute to be the same or different, the planar light emission and the linear light emission of the lamp units can be independently controlled respectively, so that the lamp units have abundant light-emitting patterns, and the light-emitting effect of the lamp units is further improved.

In the lamp unit according to an embodiment of the present disclosure, the light source assembly comprises: a first light-emitting assembly arranged on the inner side of the frame portion, and guided to emit the first light towards the first light-emitting surface; and a second light-emitting assembly arranged on the inner side of the center of the back plate, and guided to emit the second light towards the second light-emitting surface.

By means of the described arrangement, a method for providing the first light-emitting assembly and the second light-emitting assembly is provided.

In the lamp unit according to an embodiment of the present disclosure, the light source assembly comprises: a first light-emitting assembly arranged at edges of the light-emitting plate and the back plate, and guided to emit the first light towards the first light-emitting surface; and a second light-emitting assembly arranged between the frame portion and the first light-emitting assembly, and guided to emit the second light towards the second light-emitting surface.

By providing two light-emitting assemblies, the planar light emission from the first light-emitting surface and the linear light emission from the second light-emitting surface are achieved.

In the lamp unit according to an embodiment of the present disclosure, the second light-emitting assembly is supported by the inner side of the back plate.

By means of the described arrangement, a method for providing the second light-emitting assembly is provided.

In the lamp unit according to an embodiment of the present disclosure, the lamp unit further comprises: a light source assembly support member arranged on the inner side of the frame portion between edges of the light-emitting plate and the back plate, wherein the first light-emitting assembly and the second light-emitting assembly are respectively arranged on two sides of the light source assembly support member.

By providing the light source assembly support member, a method for providing the first light-emitting assembly and the second light-emitting assembly is provided.

In the lamp unit according to an embodiment of the present disclosure, the first light-emitting assembly and the second light-emitting assembly are both side-emitting-type light-emitting assemblies, and the second light is emitted by the second light-emitting assembly to the inner side of the frame portion, and is emitted via the second light-emitting surface after the optical path direction is adjusted by the frame portion.

By means of the described arrangement, a method for achieving the linear light emission of the lamp units is provided.

In the lamp unit according to an embodiment of the present disclosure, the second light-emitting surface is located on the frame portion.

By means of the described arrangement, a method for providing the second light-emitting surface is provided.

In the lamp unit according to an embodiment of the present disclosure, the frame portion comprises a first inclined surface portion, the first inclined surface portion is inclined towards the back plate relative to the light-emitting plate at the periphery of the light-emitting plate, and the second light-emitting surface is located on the first inclined surface portion.

By means of the described arrangement, the second light is emitted to the outside of the lamp unit via the first inclined surface portion; when two lamp units are spliced together, the first inclined surface portions of the two lamp units form a V-shaped groove; and visually, the second light is emitted out of the lamp units in a linear shape along the V-shaped groove, so that the linear light-emitting effect of the lamp units is more obvious.

In the lamp unit according to an embodiment of the present disclosure, the back plate comprises a back portion and a second inclined surface portion, wherein the back portion is arranged opposite to the light-emitting plate, and the second inclined surface portion is inclined towards the light-emitting plate relative to the back portion at an edge of the back portion; and the second light is emitted to the second inclined surface portion, and is emitted via the second light-emitting surface after the optical path direction is adjusted by the second inclined surface portion and the frame portion.

By arranging the second inclined surface portion on the back plate, the second light emitted from the second light-emitting assembly arranged on the inner side of the center of the back plate can be reflected to the frame portion to be emitted from the second light-emitting surface so as to form the linear light emission.

In the lamp unit according to an embodiment of the present disclosure, the frame portion comprises a side frame, and the first inclined surface portion is connected to the back plate by means of the side frame.

By means of the described arrangement, a specific method for providing the first inclined surface portion is provided.

In the lamp unit according to an embodiment of the present disclosure, the lamp unit further comprises: a light blocking member, wherein the light blocking member is located between the second light-emitting surface and the first light-emitting surface to prevent the second light from interfering with the first light.

By arranging the light blocking member between the first light-emitting surface and the second light-emitting surface, interference between the first light emitted from the first light-emitting surface and the second light emitted from the second light-emitting surface can be avoided, and the light-emitting effect of the lamp units is enhanced.

In the lamp unit according to an embodiment of the present disclosure, the lamp unit further comprises: a light shielding portion arranged on the inner side of the back portion to shield the second light from being emitted from the back portion to the outside of the lamp unit.

By arranging the light shielding portion at the back portion of the lamp unit, light emitted from the back portion of the lamp unit affecting the light-emitting effect of the lamp unit is prevented, and the waste of light is also avoided.

According to another embodiment of the present disclosure, provided is a lamp unit, comprising: a light-emitting plate having a first light-emitting surface; a back plate arranged opposite to the light-emitting plate; a frame portion supporting the light-emitting plate at the periphery of the light-emitting plate and the back plate, and forming a cavity between the light-emitting plate and the back plate; a light source assembly arranged in the cavity and capable of emitting first light and second light, wherein the first light has a first light attribute and is emitted from the first light-emitting surface, the second light has a second light attribute and is emitted from a second light-emitting surface, and the second light-emitting surface is arranged at an edge of the back plate; and at least one connection port for electrically connecting the lamp unit to another lamp unit.

By means of the described arrangement, the lamp unit can achieve linear light emission and planar light emission, so that the light-emitting patterns formed after the lamp units are spliced are more abundant, and the light-emitting effect is improved.

In the lamp unit according to another embodiment of the present disclosure, the back plate comprises a back portion and a second inclined surface portion, wherein the back portion is arranged opposite to the light-emitting plate, and the second inclined surface portion is inclined towards the light-emitting plate relative to the back portion at an edge of the back portion; and the second light-emitting surface is located on the second inclined surface portion.

By means of the described arrangement, the second light is emitted from the second inclined surface portion of the back plate to the outside of the lamp unit, and the effect of a linear halation can be achieved.

In the lamp unit according to another embodiment of the present disclosure, the frame portion comprises a side frame, and the second inclined surface portion is connected to the side frame; and the lamp unit further comprises: a flexible assembly comprising a first surface located on the inner side of the side frame, a second surface located on the inner side of the second inclined surface portion, and a third surface located on the inner side of the back portion, wherein the light source assembly is arranged on the first surface of the flexible assembly, openings for guiding the second light to be emitted to the outside of the lamp unit are arranged in the second surface of the flexible assembly, and a controller for controlling the light source assembly is arranged on the third surface.

By arranging openings in the second surface of the flexible assembly, the light source assembly may use only one light-emitting assembly to generate the first light and the second light, for example, a part of the light emitted from the light source assembly provided on the first surface of the flexible assembly as the first light is emitted out of the lamp unit via the light-emitting plate to form planar light emission, and the remaining part of the light emitted from the light source assembly as the second light is emitted out of the second inclined surface portion of the back plate via the openings to form linear light emission, thus the lamp unit simultaneously achieves linear light emission and planar light emission, so that the light-emitting patterns formed after the lamp units are spliced are more abundant, and the light-emitting effect of the lamp units is improved.

According to still another embodiment of the present disclosure, provided is a lamp system, comprising several lamp units and several connectors, wherein each lamp unit comprises: a light-emitting plate having a first light-emitting surface; a back plate arranged opposite to the light-emitting plate; a frame portion supporting the light-emitting plate at the periphery of the light-emitting plate and the back plate, and forming a cavity between the light-emitting plate and the back plate; a light source assembly arranged in the cavity and capable of emitting first light and second light, wherein the first light has a first light attribute and is emitted from the first light-emitting surface, the second light has a second light attribute and is emitted from a second light-emitting surface, and the second light-emitting surface is arranged at the periphery of the light-emitting plate; and at least one connection port for electrically connecting the lamp unit to another lamp unit, wherein adjacent lamp units are respectively connected to a connector by means of respective adjacent connection ports.

By means of the described arrangement, the lamp system can achieve linear light emission and planar light emission, so that the light-emitting patterns of the lamp system are more abundant, and the light-emitting effect is improved.

In the lamp system according to still another embodiment of the present disclosure, the first light attribute and the second light attribute may be the same or different, wherein the first light attribute and the second light attribute comprise at least one of a color temperature, a color, a brightness, or a characteristic of change of the color temperature, the color, the brightness or a combination thereof over time.

By enabling the first light attribute and the second light attribute to be the same or different, the planar light emission and the linear light emission of the lamp units can be independently controlled respectively, so that the lamp system has abundant light-emitting patterns, and the light-emitting effect of the lamp system is further improved.

In the lamp system according to still another embodiment of the present disclosure, the frame portion comprises a first inclined surface portion surrounding an edge of the light-emitting plate, and the second light-emitting surface is located on the first inclined surface portion.

By means of the described arrangement, the first inclined surface portions of two adjacent lamp units form a V-shaped groove, and the second light is emitted to the outside of the lamp units via the first inclined surface portions; and visually, the second light is emitted out of the lamp units in a linear shape along the V-shaped groove, so that the linear light-emitting effect of the lamp system is more obvious.

In the lamp system according to still another embodiment of the present disclosure, the first inclined surface portion is inclined towards the back plate relative to the light-emitting plate at an edge of the light-emitting plate, and when adjacent lamp units are spliced by means of the connection ports and the connectors, two adjacent first inclined surface portions on the adjacent lamp units form a V-shaped groove.

By means of the described arrangement, a method for forming the V-shaped groove is provided.

BRIEF DESCRIPTION OF THE DRAWINGS

Drawings provided therein for further understanding of the present disclosure form a part of the present disclosure, and the exemplary embodiments of the present disclosure and the illustrations thereof are used to explain the present disclosure rather than to limit the present disclosure. In the drawings.

DETAILED DESCRIPTION

In order to make persons skilled in the art better understand the solutions of the present disclosure, the following clearly and completely describes the technical solutions in the embodiments of the present disclosure with reference to the drawings in the embodiments of the present disclosure. Apparently, the described embodiments are merely some of rather than all of the embodiments of the present disclosure. All other embodiments obtained by persons of ordinary skill in the art based on the embodiments of the present disclosure without inventive efforts shall belong to the scope of protection of the present disclosure.

Figure 1:
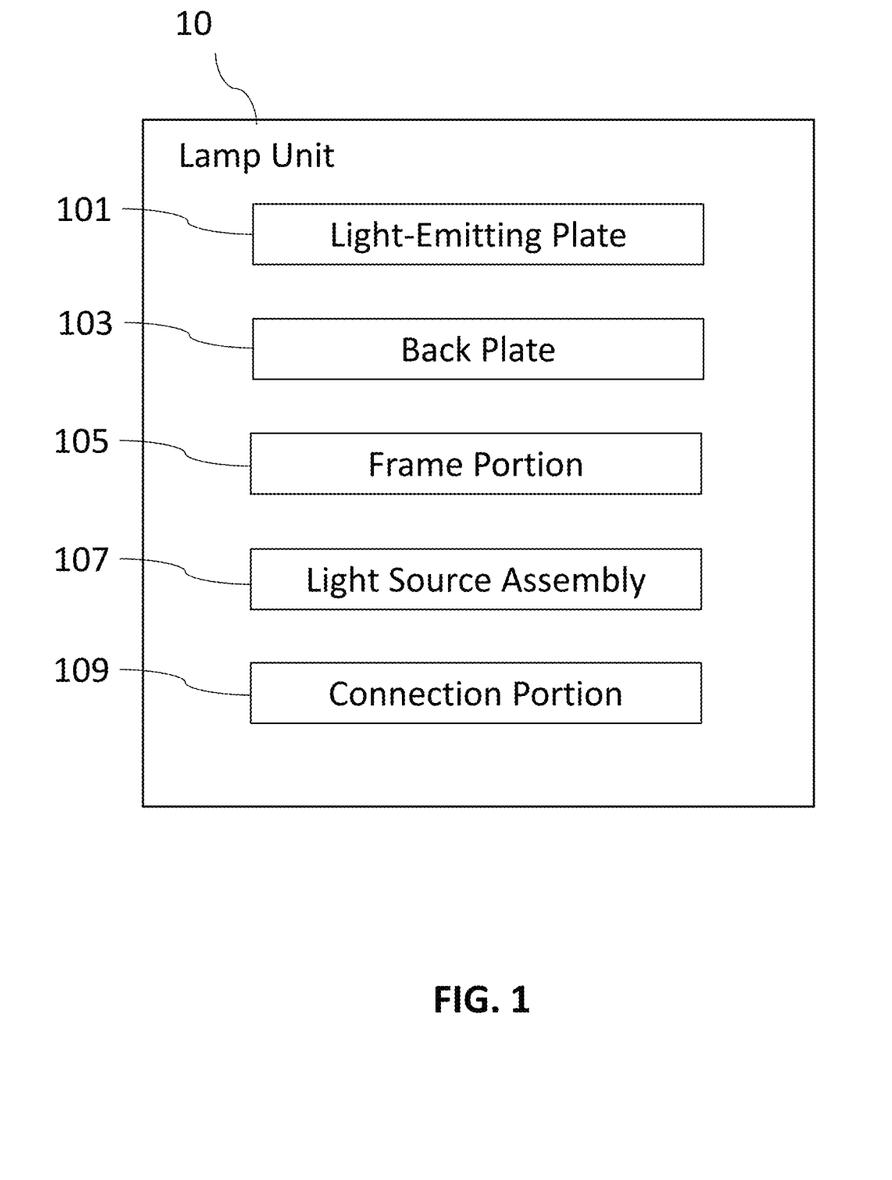
FIG. 1 shows a block diagram of a lamp unit according to an embodiment of the present disclosure.
Figure 2:
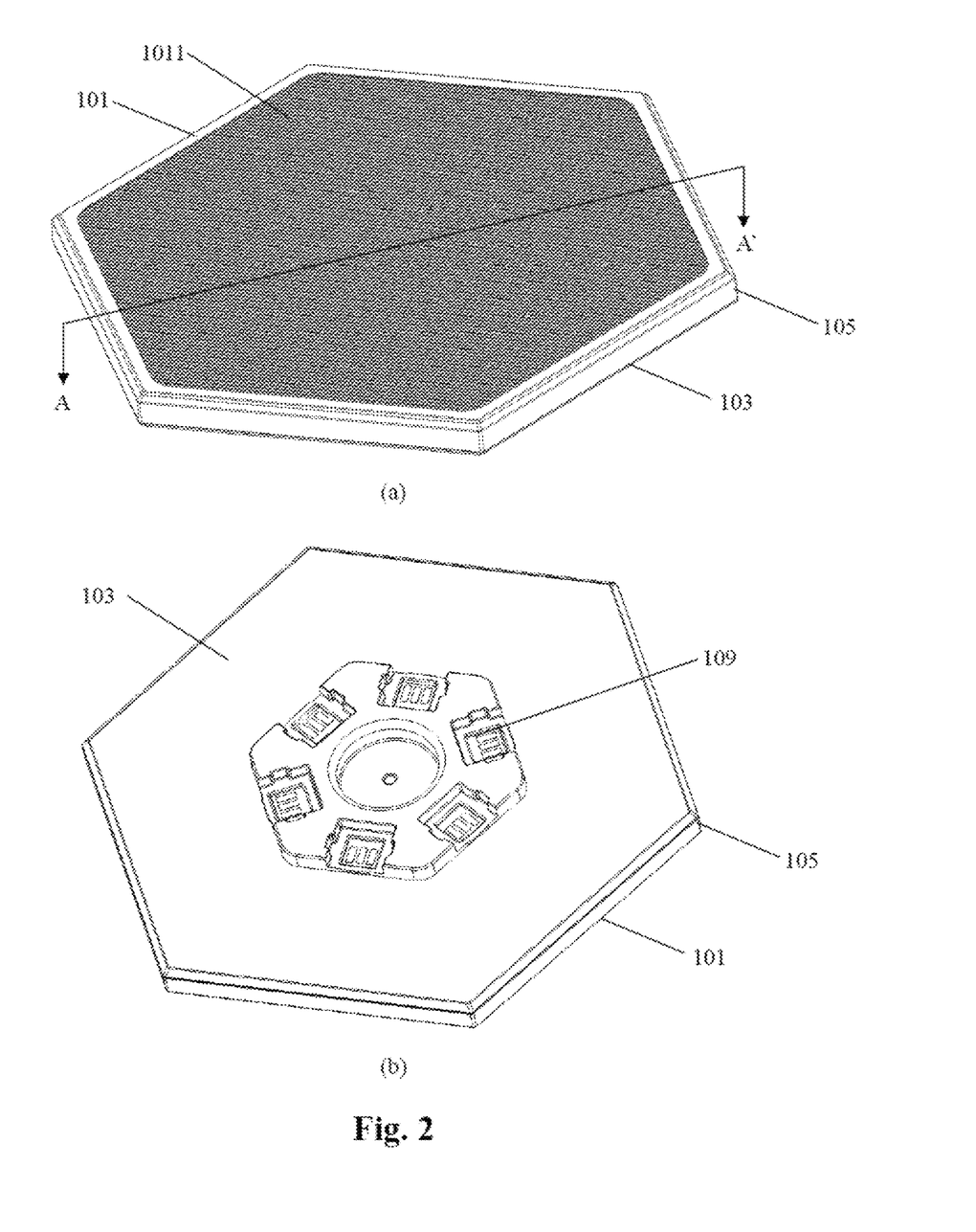
FIG. 2 shows a schematic overall view of a lamp unit according to an embodiment of the present disclosure.
Figure 3:
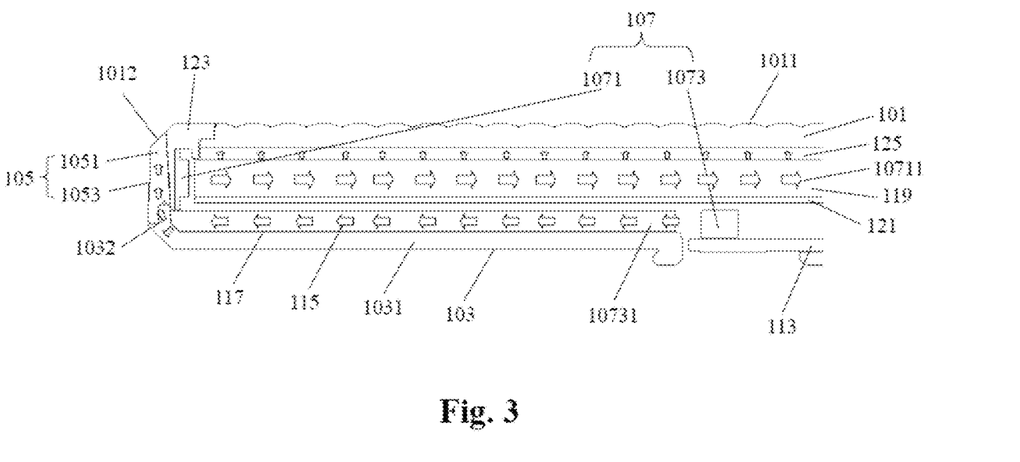
FIG. 3 shows an example of a cross-sectional view of the lamp unit taken along line AA' shown in FIG. 2.

According to an embodiment of the present disclosure, a lamp unit is provided. FIG. 1 shows a block diagram of a lamp unit according to an embodiment of the present disclosure. FIG. 2 shows a schematic overall view of a lamp unit according to an embodiment of the present disclosure, wherein (a) of FIG. 2 is a front view of the lamp unit, and (b) of FIG. 2 is a rear view of the lamp unit. FIG. 3 shows an example of a cross-sectional view of the lamp unit taken along line AA' shown in FIG. 2. It is noted that, because the lamp unit has a symmetrical structure, for clarity, only the left part of the cross section taken along line AA' is shown in FIG. 3, and the right part of the cross section has a structure symmetrical to the left part. The following describes a lamp unit according to an embodiment of the present disclosure with reference to FIG. 1 to FIG. 3.

A lamp unit 10 may comprise a light-emitting plate 101, a back plate 103, a frame portion 105, a light source assembly 107, and at least one connection port 109.

The light-emitting plate 101 has a first light-emitting surface 1011, and the back plate 103 is arranged opposite to the light-emitting plate 101.

The frame portion 105 supports the light-emitting plate 101 at the periphery of the light-emitting plate 101 and the back plate 103, and forms a cavity between the light-emitting plate 101 and the back plate 103.

The light source assembly 107 is arranged in the cavity and capable of emitting first light 10711 and second light 10731, wherein the first light 10711 has a first light attribute and is emitted from the first light-emitting surface 1011, the second light 10731 has a second light attribute and is emitted from a second light-emitting surface 1012, and the second light-emitting surface 1012 is arranged at the periphery of the light-emitting plate 101.

At least one connection port 109 is used for electrically connecting the lamp unit 10 to another lamp unit.

Specifically, as shown in FIG. 3, the back plate 103 may comprise a back portion 1031 and an inclined surface portion 1032. Note that the inclined surface portion 1032 herein is also referred to as a "second inclined surface portion" 1032. The back portion 1031 is arranged opposite to the light-emitting plate 101, and the size of the back portion 1031 corresponds to the size of the light-emitting plate 101. The second inclined surface portion 1032 extends, in an inclined manner, from an edge of the back portion 1031 towards the light-emitting plate 101 relative to the back portion 1031.

The frame portion 105 connects the light-emitting plate 101 to the back plate 103 from a side surface of the light-emitting plate 101 and a side surface of the second inclined surface portion 1032 of the back plate 103, so that a cavity is formed between the back plate 103 and the light-emitting plate 101, and other assemblies of the lamp unit 10, such as the light source assembly 107, are accommodated in the cavity.

The transmittance of the frame portion 105 may be greater than the transmittance of the back plate 103. For example, the frame portion 105 is made of a transparent material, and the back plate 103 is made of a translucent material.

As shown in FIG. 3, the light source assembly 107 may comprise a first light-emitting assembly 1071 and a second light-emitting assembly 1073. The first light-emitting assembly 1071 is arranged on the inner side of the frame portion 105, and guided to emit the first light 10711 towards the first light-emitting surface 1011 of the light-emitting plate 101. The second light-emitting assembly 1073 is arranged on the inner side of the central portion of the back portion 1031 of the back plate 103, and guided to emit the second light 10731 towards the second inclined surface portion 1032 of the back plate 103 and the frame portion 105, and the second light 10731 is emitted out of the lamp unit 10 via the second light-emitting surface 1012.

Specifically, as shown in FIG. 3, a main board 113 for controlling the second light-emitting assembly 1073 is arranged at the central portion of the back plate 103, and the second light-emitting assembly 1073 is arranged on the main board 113. The second light-emitting assembly 1073 may be a plurality of LED lamps, but the present disclosure is not limited thereto, and any light source may be used as the second light-emitting assembly 1073.

On the region of the back portion 1031 of the back plate 103 other than the central portion, a lower light guide plate 115 may be further arranged for guiding the second light 10731 emitted from the second light-emitting assembly 1073 to the second inclined surface portion 1032 of the back plate 103 and the frame portion 105, and more specifically, the second light 10731 emitted from the second light-emitting assembly 1073 is guided to the second inclined surface portion 1032 of the back plate 103, and the optical path of the second light 10731 is changed (for example, reflected) by the second inclined surface portion 1032 so that the second light enters the light-transmissive frame portion 105, and is emitted from the frame portion 105 to the outside of the lamp unit 10.

A light shielding portion 117 may be further arranged between the back portion 1031 of the back plate 103 and the lower light guide plate 115 to prevent the second light 10731 emitted from the second light-emitting assembly 1073 from being emitted out of the lamp unit 10 via the back portion 1031. The light shielding portion may be a light shielding film, but the present disclosure is not limited thereto, and any element capable of blocking the second light may be used as the light shielding portion.

The first light-emitting assembly 1071 is arranged on the inner side of the frame portion 105, and guided to emit the first light 10711 towards the light-emitting plate 101. Specifically, an upper light guide plate 119 may be further arranged on the lower light guide plate 115 for guiding the first light 10711 emitted from the first light-emitting assembly 1071 to the light-emitting plate 101. The first light-emitting assembly 1071 may be a plurality of LED lamps, but the present disclosure is not limited thereto, and any light source may be used as the first light-emitting assembly 1071.

The first light attribute of the first light 10711 and the second light attribute of the second light 10731 may be the same or different, and the light attributes of the first light 10711 and the second light 10731 may be independently controlled by a controller not shown in the figure, respectively. The first light attribute and the second light attribute may comprise at least one of a color temperature, a color, a brightness, or a characteristic of change of the color temperature, the color, the brightness or a combination thereof over time, including but not limited to flashing, gradual change, etc.

A reflection portion 121 may be further arranged between the upper light guide plate 119 and the lower light guide plate 115 for reflecting the first light 10711 and the second light 10731 back into the upper light guide plate 119 and the lower light guide plate 115 respectively, so that the first light 10711 and the second light 10731 are confined to propagate in the upper light guide plate 119 and the lower light guide plate 115 respectively.

As shown in FIG. 3, the angle between the second inclined surface portion 1032 and the back plate 103 may be 135 degrees, but the present disclosure is not limited thereto, and the angle between the second inclined surface portion 1032 and the back plate 103 may be set as required.

The frame portion 105 may comprise an inclined surface portion 1051 and a side frame 1053. Note that the inclined surface portion 1051 herein is also referred to as a "first inclined surface portion" 1051.

The first inclined surface portion 1051 is inclined towards the back plate 103 relative to the light-emitting plate 101 at the periphery of the light-emitting plate 101, the second light-emitting surface 1012 may be located on the first inclined surface portion 1051, and the second light 10731 entering the frame portion 105 is emitted to the outside of the lamp unit 10 via the first inclined surface portion 1051. The angle between the first inclined surface portion 1051 and the light-emitting plate 101 may be 45 degrees, but the present disclosure is not limited thereto, and the angle between the first inclined surface portion 1051 and the light-emitting plate 101 may be set as required.

The side frame 1053 connects the first inclined surface portion 1051 to the back plate 103.

In the lamp unit 10 shown in FIG. 3, the first inclined surface portion 1051 and the side frame 1053 are integrally formed, but the present disclosure is not limited thereto, and the first inclined surface portion 1051 and the side frame 1053 may be formed separately.

The lamp unit 10 may further comprise a light blocking member 123.

The light blocking member 123 may be arranged between the second light-emitting surface 1012 and the first light-emitting surface 1011, that is, the light blocking member 123 may be arranged between the frame portion 105 and the light-emitting plate 101 and on the inner side of the frame portion 105, so as to prevent the second light 10731 from interfering with the first light 10711.

Note that the light blocking member 123 is made of a material that is non-light transmissive. The frame portion 105 and the light blocking member 123 may be formed by double-shot molding.

The light-emitting plate 101 may be an anti-glare prism plate. The first light 10711 emitted from the first light-emitting assembly 1071 is emitted from the light-emitting plate 101 to the outside of the lamp unit 10 to form planar light emission. In order to make the planar light emission from the light-emitting plate 101 more uniform, for example, a diffusion plate 125 may be further arranged between the light-emitting plate 101 and the upper light guide plate 119.

The second light 10731 emitted from the second light-emitting assembly 1073 is emitted from the first inclined surface portion 1051 of the frame portion 105 to the outside of the lamp unit 10 to form linear light emission.

It is contemplated that when two lamp units are spliced together, the first inclined surface portions of the two lamp units form a V-shaped groove; and visually, the second light is emitted out of the lamp units in a linear shape along the V-shaped groove, so that the linear light-emitting effect of the lamp units is more obvious.

It is contemplated that, by separately controlling the light attributes and the light-emitting modes of the first light-emitting assembly 1071 and the second light-emitting assembly 1073, the lamp units may implement various combinations of linear light emission/linear light emission and planar light emission, so that the light-emitting patterns of the lamp are more diverse, and the light-emitting effect is better.

(b) of FIG. 2 shows the case where at least one connection port 109 is arranged at the central portion of the back plate 103, but the present disclosure is not limited thereto. It is contemplated that the at least one connection port 109 may be arranged at an edge of the frame portion in a form of a USB interface.

The case where the frame portion 105 and the back plate 103 are formed separately is described above with reference to FIG. 1 to FIG. 3, but the present disclosure is not limited thereto, and the frame portion 105 and the back plate 103 may also be integrally formed.

Figure 4:
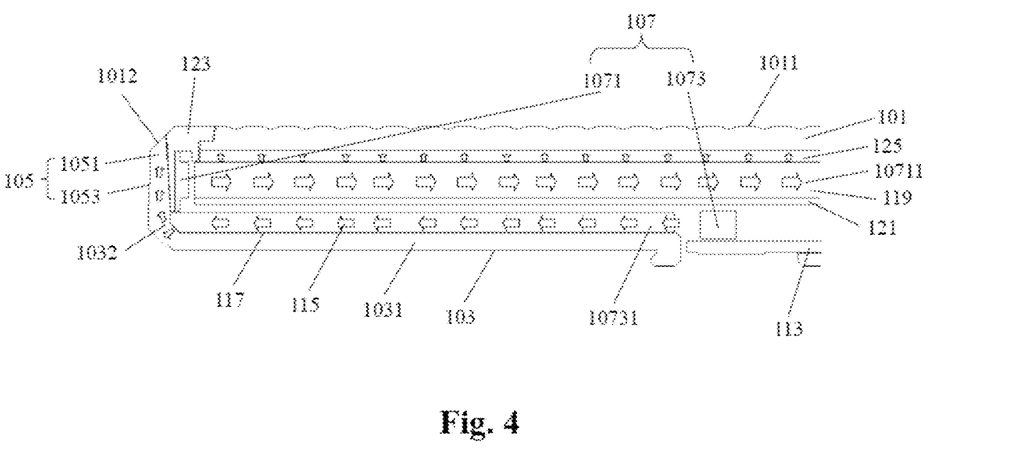
FIG. 4 shows another example of a cross-sectional view of the lamp unit taken along line AA' shown in FIG. 2.

FIG. 4 shows another example of a cross-sectional view of the lamp unit taken along line AA' shown in FIG. 2. As shown in FIG. 4, the frame portion 105 and the back plate 103 are integrally formed. In addition, other structures of the lamp unit shown in FIG. 4 are the same as those of the lamp unit 10 described with reference to FIG. 1 to FIG. 3. In order to avoid obscuring the present disclosure due to excessive description, other structures in FIG. 4 will not be described again.

Note that, in the lamp unit 10 shown in FIG. 3 and FIG. 4, the first light-emitting assembly and the second light-emitting assembly are both side-emitting-type light-emitting assemblies.

The structure of the lamp unit in which the second light-emitting assembly is arranged on the inner side of the center of the back plate is described above with reference to FIG. 1 to FIG. 4, but the present disclosure is not limited thereto. The second light-emitting assembly may also be arranged between the frame portion and the first light-emitting assembly, that is, the second light-emitting assembly may also be arranged at an edge of the lamp unit.

Figure 5:
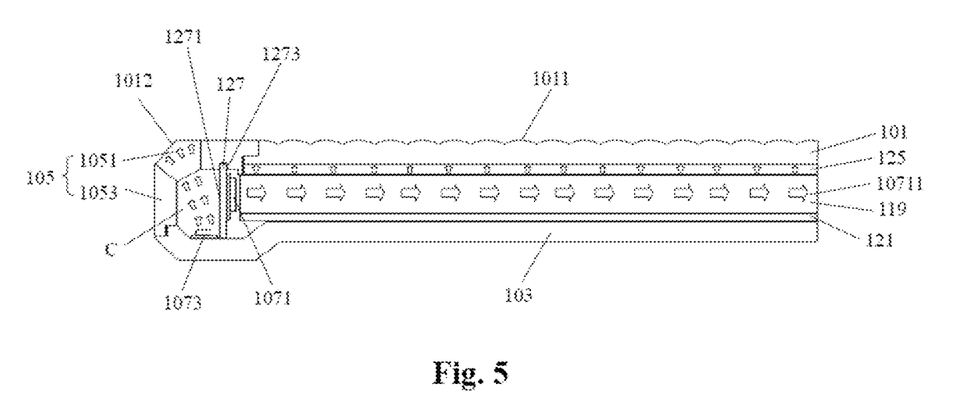
FIG. 5 shows another example of a cross-sectional view of the lamp unit taken along line AA' shown in FIG. 2.
Figure 6:
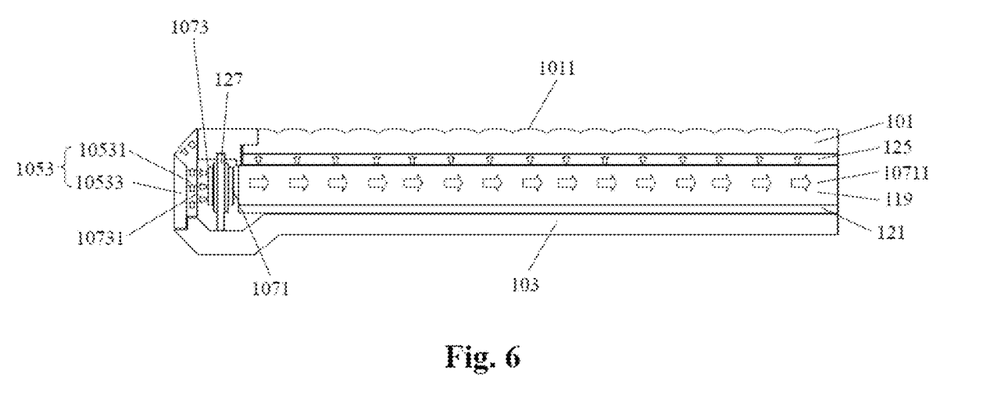
FIG. 6 shows another example of a cross-sectional view of the lamp unit taken along line AA' shown in FIG. 2.

FIG. 5 and FIG. 6 show other examples of a cross-sectional view of the lamp unit taken along line AA' shown in FIG. 2, respectively, where the second light-emitting assembly is arranged between the frame portion and the first light-emitting assembly. In FIG. 5 and FIG. 6, components similar to those in FIG. 1 to FIG. 4 are denoted by the same reference numerals.

In the lamp unit 10 shown in FIG. 5, a light source assembly support member 127 is arranged between opposite edges of the light-emitting plate 101 and the back plate 103, and the frame portion 105 supports the light-emitting plate 101 at the periphery of the light-emitting plate 101 and the back plate 103, and forms an inner cavity C with the light source assembly support member 127. The light source assembly support member 127 has a first surface 1271 facing the inner cavity C and a second surface 1273 opposite to the first surface 1271. Preferably, the light source assembly support member 127 is made of a non-light transmissive material.

The first light-emitting assembly 1071 is arranged on the second surface 1273 of the light source assembly support member 127, and guided to emit the first light 10711 towards the first light-emitting surface 1011.

The second light-emitting assembly 1073 is arranged on the inner side of the back plate 103 between the frame portion 105 and the light source assembly support member 127. The second light 10731 emitted from the second light-emitting assembly 1073 is guided to be emitted towards the second light-emitting surface 1012.

In the lamp unit 10 shown in FIG. 5, the first inclined surface portion 1051 and the side frame 1053 of the frame portion 105 and the back plate 103 are formed separately, the first inclined surface portion 1051 is made of a light-transmissive material, the side frame 1053 is made of a non-light transmissive material, the second light-emitting surface 1012 is located on the frame portion 105, and specifically, the second light-emitting surface 1012 is located on the first inclined surface portion 1051. The second light 10731 emitted from the second light-emitting assembly 1073 is emitted out of the lamp unit 10 via the second light-emitting surface 1012.

In the lamp unit 10 shown in FIG. 5, as the second light-emitting assembly 1073 is arranged between the frame portion 105 and the first light-emitting assembly 1071 rather than on the inner side of the center of the back plate 103, the lower light guide plate and the light shielding portion are not arranged on the back portion 1031 of the back plate 103.

Except for the above description, the other components of the lamp unit 10 shown in FIG. 5 are the same as the corresponding components of the lamp unit described with reference to FIG. 1 to FIG. 4. In order to avoid obscuring the present disclosure due to excessive description, repeated description of these components will be omitted.

The lamp unit 10 shown in FIG. 6 is different from the lamp unit 10 shown in FIG. 5 in that, in the lamp unit 10 shown in FIG. 6, the first light-emitting assembly 1071 and the second light-emitting assembly 1073 are arranged on two sides of the light source assembly support member 127 respectively. Specifically, the first light-emitting assembly 1071 is arranged on the second surface 1273 of the light source assembly support member 127, and the second light-emitting assembly 1073 is arranged on the first surface 1271 of the light source assembly support member 127. In addition, the side frame 1053 of the frame portion 105 is composed of a first portion 10531 which guides light and a second portion 10533 which is non-light transmissive and is arranged on the outer side of the first portion 10531; the second light 10731 emitted from the second light-emitting assembly 1073 is emitted to the first portion 10531, and is emitted to the outside of the lamp unit 10 via the second light-emitting surface 1012 after the optical path is adjusted by the first portion 10531; and the second portion 10533 which is non-light transmissive prevents the second light 10731 emitted from the second light-emitting assembly 1073 from being emitted from a side of the frame portion 105.

Except for the above description, the other components of the lamp unit 10 shown in FIG. 6 are the same as the corresponding components of the lamp unit described with reference to FIG. 5. In order to avoid obscuring the present disclosure due to excessive description, repeated description of these components will be omitted.

It should be noted here that the first light-emitting assembly and the second light-emitting assembly of the lamp unit 10 shown in FIG. 6 are both side-emitting-type light-emitting assemblies.

The lamp unit shown in FIG. 5 and FIG. 6 can likewise achieve effects similar to those of the lamp unit described with reference to FIG. 1 to FIG. 4.

The foregoing describes, with reference to FIG. 1 to FIG. 6, that the light source assembly of a lamp unit comprises the first light-emitting assembly and the second light-emitting assembly to achieve linear light emission and planar light emission of the lamp unit, but the present disclosure is not limited thereto. The light source assembly of the lamp unit may also comprise one light-emitting assembly to achieve linear light emission and planar light emission of the lamp unit. A lamp unit that uses one light-emitting assembly to achieve linear light emission and planar light emission according to another embodiment of the present disclosure is described below.

Figure 7:
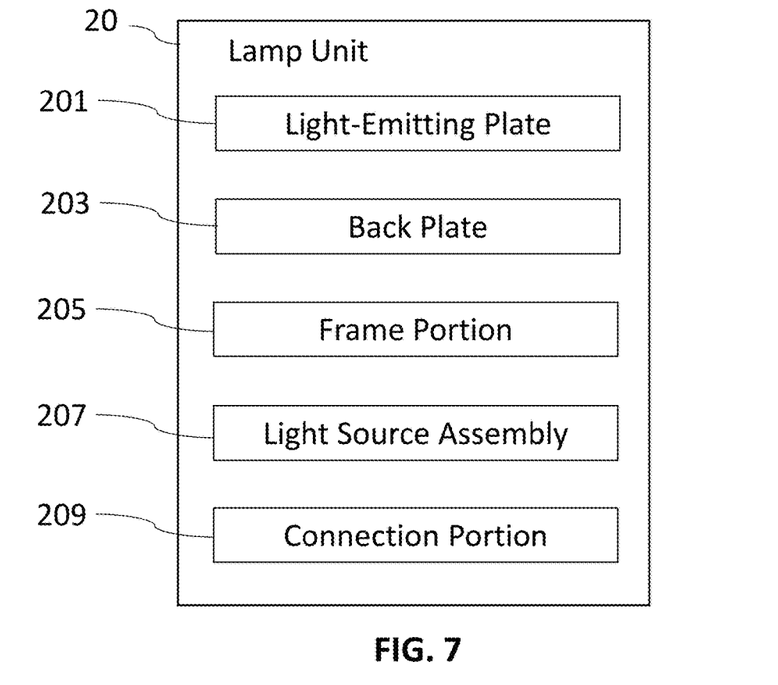
FIG. 7 shows a block diagram of a lamp unit according to another embodiment of the present disclosure.
Figure 8:
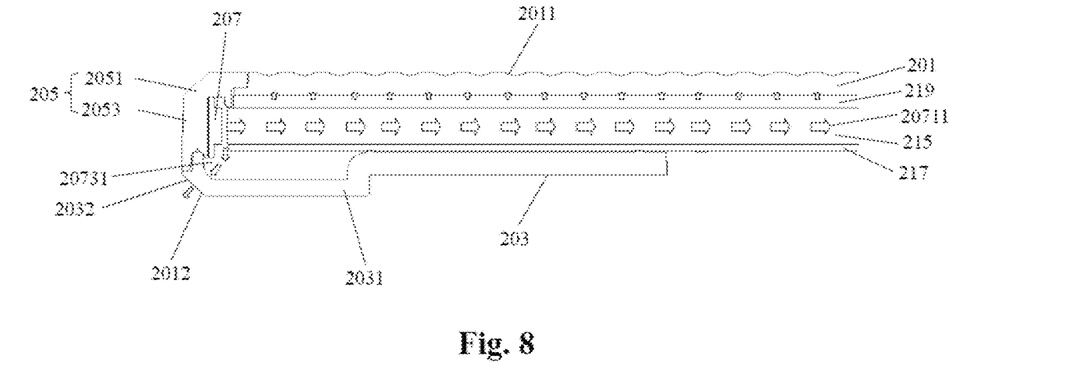
FIG. 8 shows an example of a cross-sectional view of the lamp unit taken similarly along line AA' shown in FIG. 2.
Figure 9:
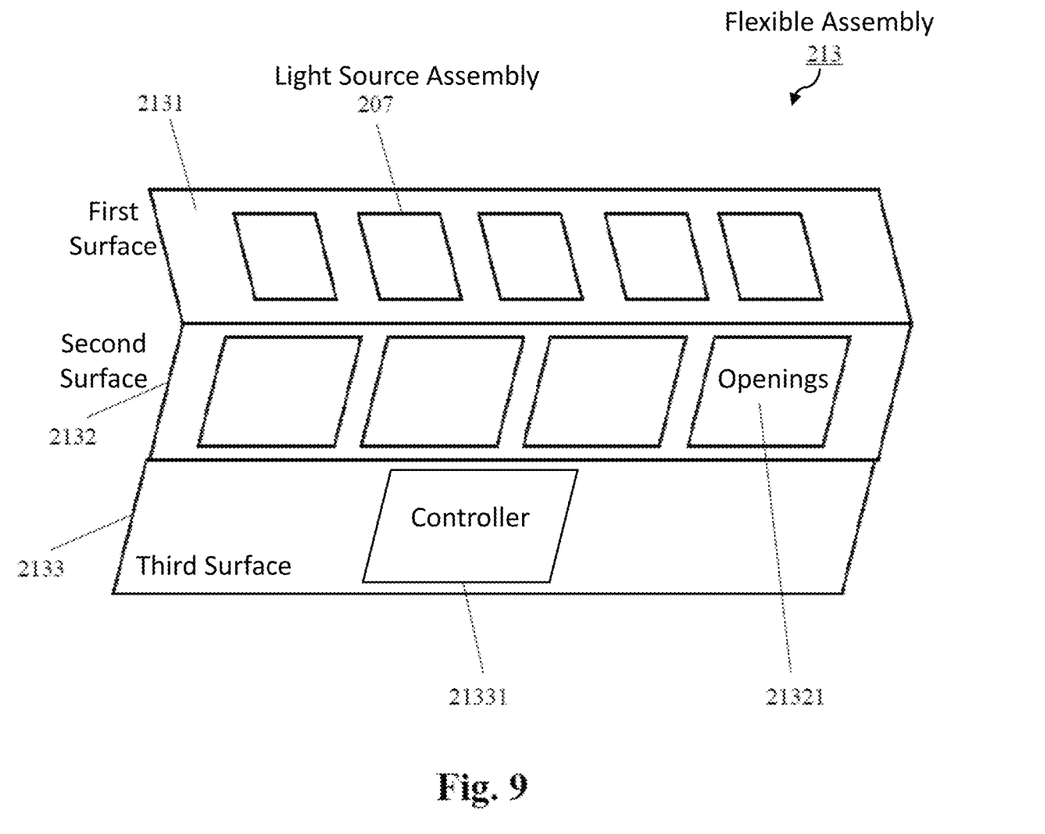
FIG. 9 shows a specific configuration of a flexible assembly in the lamp unit according to another embodiment of the present disclosure.

FIG. 7 shows a block diagram of a lamp unit according to another embodiment of the present disclosure. As the overall view of the lamp unit according to another embodiment of the present disclosure is the same as the overall view of the lamp unit shown in FIG. 2, for simplicity, the overall view of the lamp unit according to another embodiment of the present disclosure is not further illustrated herein, and FIG. 2 can be referred to when it is necessary to utilize the view of the lamp unit according to another embodiment in the following. FIG. 8 shows an example of a cross-sectional view of the lamp unit taken similarly along line AA' shown in FIG. 2. FIG. 9 shows a specific configuration of a flexible assembly in the lamp unit according to another embodiment of the present disclosure.

As shown in FIG. 7 to FIG. 8, the lamp unit 20 may comprise a light-emitting plate 201, a back plate 203, a frame portion 205, a light source assembly 207 and at least one connection port 209.

The light-emitting plate 201 has a first light-emitting surface 2011, and the back plate 203 is arranged opposite to the light-emitting plate 201.

The frame portion 205 supports the light-emitting plate 201 at the periphery of the light-emitting plate 201 and the back plate 203, and forms a cavity between the light-emitting plate 201 and the back plate 203.

The light source assembly 207 is arranged in the cavity and capable of emitting first light 20711 and second light 20731, wherein the first light 20711 has a first light attribute and is emitted from the first light-emitting surface 2011, the second light 20731 has a second light attribute and is emitted from a second light-emitting surface 2012, and the second light-emitting surface 2012 is arranged at the periphery of the back plate 203.

At least one connection port 209 is used for electrically connecting the lamp unit 20 to another lamp unit.

Specifically, as shown in FIG. 8, the back plate 203 may comprise a back portion 2031 and a second inclined surface portion 2032. The back portion 2031 is arranged opposite to the light-emitting plate 201, and the size of the back portion 2031 corresponds to the size of the light-emitting plate 201. The second inclined surface portion 2032 extends, in an inclined manner, from an edge of the back portion 2031 towards the light-emitting plate 201. The second light-emitting surface 2012 is located on the second inclined surface portion 2032.

The frame portion 205 connects the light-emitting plate 201 to the back plate 203 from a side surface of the light-emitting plate 201 and a side surface of the side portion 2032 of the back plate 203, so that a cavity is formed between the back portion 2031 and the light-emitting plate 201, and other assemblies of the lamp unit 20, such as the light source assembly 207, are accommodated in the cavity. The frame portion 205 is non-light transmissive.

The frame portion 205 comprises a first inclined surface portion 2051 and a side frame 2053. The first inclined surface portion 2051 is inclined towards the back plate 203 relative to the light-emitting plate 201 at the periphery of the light-emitting plate 201. The angle between the first inclined surface portion 2051 and the light-emitting plate 201 may be 45 degrees, but the present disclosure is not limited thereto, and the angle between the first inclined surface portion 2051 and the light-emitting plate 201 may be set as required. The frame portion 205 does not necessarily have the first inclined surface portion 2051.

The side frame 2053 connects the first inclined surface portion 2051 to the back plate 203. Specifically, the second inclined surface portion 2032 of the back plate 203 is connected to the side frame 2053.

The lamp unit 20 may further comprise a flexible assembly 213.

As shown in FIG. 8 and FIG. 9, the flexible assembly 213 comprises a first surface 2131 located on the inner side of the side frame 2053, a second surface 2132 located on the inner side of the second inclined surface portion 2032 of the back plate 203, and a third surface 2133 located on the inner side of the back portion 2031 of the back plate 203.

The light source assembly 207 is arranged on the first surface 2131, and a part of light emitted from the light source assembly 207 is guided to be emitted towards the light-emitting plate 201 as the first light 20711.

Openings 21321 for guiding a part of light emitted from the light source assembly 207 as the second light 20731 to be emitted from the second light-emitting surface 2012 to the outside of the lamp unit 20 are arranged in the second surface 2132 of the flexible assembly 213, and a controller 21331 for controlling the light emission of the light source assembly 207 is arranged on the third surface 2133.

A light guide plate 215 may be arranged on the back portion 2031 of the back plate 203 to guide a part of light emitted from the light source assembly 207 to the light-emitting plate 201 as the first light 2071. A reflection portion 217 may be further arranged between the light guide plate 211 and the back portion 2031 for reflecting the first light 20711 emitted from the light source assembly 207 back into the light guide plate 215, so that the first light 20711 is confined to propagate in the light guide plate 215.

The second light 20731 emitted from the openings 21321 pass through the second inclined surface portion 2032 and is emitted to the outside of the lamp unit 20. The angle between the second inclined surface portion 2032 and the back plate 203 may be 135 degrees, but the present disclosure is not limited thereto, and the angle between the second inclined surface portion 2032 and the back plate 203 may be set as required.

In the lamp unit 20 shown in FIG. 8, the frame portion 205 is made of a non-light transmissive material, thereby preventing light emitted from the light source assembly 207 from being transmitted in the frame portion 205. At least the second inclined surface portion 2032 of the back plate 203 is made of a light-transmissive material, for example, the second inclined surface portion 2032 of the back plate 203 is light-transmissive or semi-transmissive, and the entire back plate 203 may also be light-transmissive or semi-transmissive.

The light-emitting plate 201 may be an anti-glare prism plate. The first light 20711 emitted from the light source assembly 207 is emitted from the light-emitting plate 201 to the outside of the lamp unit 20 to form planar light emission. In order to make the planar light emission from the light-emitting plate 201 more uniform, for example, a diffusion plate 219 may be further arranged between the light-emitting plate 201 and the light guide plate 215.

A part of the light emitted from the light source assembly 207 as the second light 20731 passes through the second inclined surface portion 2032 of the back plate 203 via the openings 21321 and is emitted to the outside of the lamp unit 20 to form linear light emission.

It can be contemplated that, when two lamp units are spliced together, the second inclined surface portions of the two lamp units form a V-shaped groove, and the light emitted along the V-shaped groove formed by the second inclined surface portions has a linear halation effect.

As providing only one light source assembly in the lamp unit 20 achieves linear light emission and planar light emission of the lamp unit, the structure of the lamp unit is simplified, and the light-emitting effect of the lamp unit is also improved.

Similar to the connection port 109 in (b) of FIG. 2, at least one connection port 209 is arranged at the central portion of the back plate 203, but the present disclosure is not limited thereto. It is contemplated that the at least one connection port 209 may be arranged at an edge of the frame portion 205 in a form of a USB interface.

Figure 10:
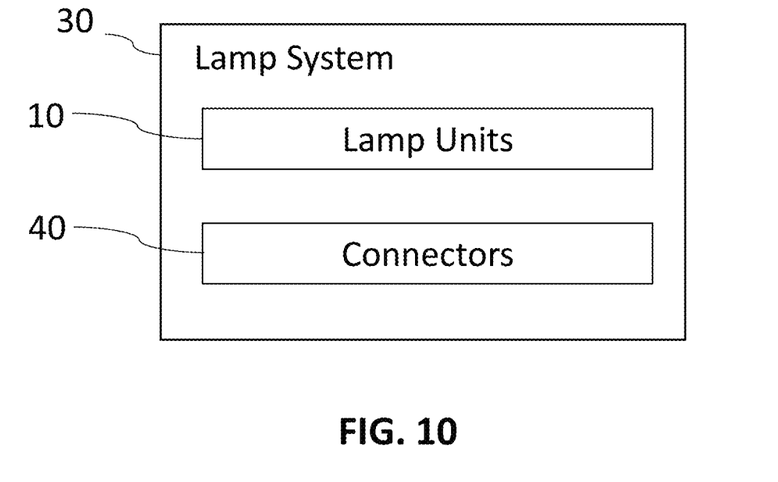
FIG. 10 shows a block diagram of a lamp system according to another embodiment of the present disclosure.

According to another embodiment of the present disclosure, provided is a lamp system. FIG. 10 shows a block diagram of a lamp system according to another embodiment of the present disclosure.

As shown in FIG. 10, a lamp system 30 comprises several lamp units 10 and several connectors 40, wherein each lamp unit comprises: a light-emitting plate having a first light-emitting surface; a back plate arranged opposite to the light-emitting plate; a frame portion supporting the light-emitting plate at the periphery of the light-emitting plate and the back plate, and forming a cavity between the light-emitting plate and the back plate; a light source assembly arranged in the cavity and capable of emitting first light and second light, wherein the first light has a first light attribute and is emitted from the first light-emitting surface, the second light has a second light attribute and is emitted from a second light-emitting surface, and the second light-emitting surface is arranged at the periphery of the light-emitting plate; and at least one connection port for electrically connecting the lamp unit to another lamp unit, wherein adjacent lamp units are respectively connected to a connector by means of respective adjacent connection ports.

It should be noted herein that the specific structure of each lamp unit 10 in the lamp system 30 is completely the same as the structure described with reference to FIG. 1 to FIG. 4. In order to avoid obscuring the present disclosure due to excessive description, the specific structure of the lamp unit 10 will not be described again.

The connector 40 may be a flexible conductor having contactors on both ends, and the contactors on both ends of the connector 40 electrically connect the lamp units together by means of the connection ports of the lamp units.

By means of the described arrangement, the lamp system can achieve linear light emission and planar light emission, so that the light-emitting patterns of the lamp system are more abundant, and the light-emitting effect is improved.

In the foregoing embodiments of the present disclosure, the description of each embodiment has its emphasis, and for the part not described in detail in a certain embodiment, reference may be made to the relevant description of other embodiments.

The above are only preferred embodiments of the present disclosure. It should be noted that, for persons of ordinary skill in the art, several improvements and modifications may be made without departing from the principle of the present disclosure, and these improvements and modifications shall also belong to the scope of protection of the present disclosure.

The invention claimed is:

1. A lamp unit, comprising:
a light-emitting plate having a first light-emitting surface;
a back plate arranged opposite to the light-emitting plate;
a frame portion supporting the light-emitting plate at the periphery of the light-emitting plate and the back plate, and forming a cavity between the light-emitting plate and the back plate;
a light source assembly arranged in the cavity and capable of emitting first light and second light, wherein the first light has a first light attribute and is emitted from the first light-emitting surface, the second light has a second light attribute and is emitted from a second light-emitting surface, and the second light-emitting surface is arranged at the periphery of the light-emitting plate; and
at least one connection port for electrically connecting the lamp unit to another lamp unit.

2. The lamp unit according to claim 1, wherein
the first light attribute and the second light attribute are the same or different, wherein the first light attribute and the second light attribute comprise at least one of a color temperature, a color, a brightness, or a characteristic of change of the color temperature, the color, the brightness or a combination thereof over time.

3. The lamp unit according to claim 2, wherein
the light source assembly comprises:
a first light-emitting assembly arranged on the inner side of the frame portion, and guided to emit the first light towards the first light-emitting surface; and
a second light-emitting assembly arranged on the inner side of the center of the back plate, and guided to emit the second light towards the second light-emitting surface.

4. The lamp unit according to claim 2, wherein
the light source assembly comprises:
a first light-emitting assembly arranged at edges of the light-emitting plate and the back plate, and guided to emit the first light towards the first light-emitting surface; and
a second light-emitting assembly arranged between the frame portion and the first light-emitting assembly, and guided to emit the second light towards the second light-emitting surface.

5. The lamp unit according to claim 4, wherein
the second light-emitting assembly is supported by the inner side of the back plate.

6. The lamp unit according to claim 4, wherein
the lamp unit further comprises:
a light source assembly support member arranged on the inner side of the frame portion between edges of the light-emitting plate and the back plate, wherein the first light-emitting assembly and the second light-emitting assembly are respectively arranged on two sides of the light source assembly support member.

7. The lamp unit according to claim 3, wherein
the first light-emitting assembly and the second light-emitting assembly are both side-emitting-type light-emitting assemblies, and
the second light is emitted by the second light-emitting assembly to the inner side of the frame portion, and is emitted via the second light-emitting surface after the optical path direction is adjusted by the frame portion.

8. The lamp unit according to claim 3, wherein
the second light-emitting surface is located on the frame portion.

9. The lamp unit according to claim 8, wherein
the frame portion comprises a first inclined surface portion, the first inclined surface portion is inclined towards the back plate relative to the light-emitting plate at the periphery of the light-emitting plate, and the second light-emitting surface is located on the first inclined surface portion.

10. The lamp unit according to claim 9, wherein
the back plate comprises a back portion and a second inclined surface portion, wherein the back portion is arranged opposite to the light-emitting plate, and the second inclined surface portion is inclined towards the light-emitting plate relative to the back portion at an edge of the back portion; and
the second light is emitted to the second inclined surface portion, and is emitted via the second light-emitting surface after the optical path direction is adjusted by the second inclined surface portion and the frame portion.

11. The lamp unit according to claim 9, wherein
the frame portion comprises a side frame, and the first inclined surface portion is connected to the back plate by means of the side frame.

12. The lamp unit according to claim 2, wherein
the lamp unit further comprises:
a light blocking member, wherein the light blocking member is located between the second light-emitting surface and the first light-emitting surface to prevent the second light from interfering with the first light.

13. The lamp unit according to claim 10, wherein
the lamp unit further comprises:
a light shielding portion arranged on the inner side of the back portion to shield the second light from being emitted from the back portion to the outside of the lamp unit.

14. A lamp system, comprising several lamp units and several connectors, wherein each lamp unit comprises:
a light-emitting plate having a first light-emitting surface;
a back plate arranged opposite to the light-emitting plate;
a frame portion supporting the light-emitting plate at the periphery of the light-emitting plate and the back plate, and forming a cavity between the light-emitting plate and the back plate;
a light source assembly arranged in the cavity and capable of emitting first light and second light, wherein the first light has a first light attribute and is emitted from the first light-emitting surface, the second light has a second light attribute and is emitted from a second light-emitting surface, and the second light-emitting surface is arranged at the periphery of the light-emitting plate; and
at least one connection port for electrically connecting the lamp unit to another lamp unit,
wherein adjacent lamp units are respectively connected to a connector by means of respective adjacent connection ports.

15. The lamp system according to claim 14, wherein
the first light attribute and the second light attribute may be the same or different, wherein the first light attribute and the second light attribute comprise at least one of a color temperature, a color, a brightness, or a characteristic of change of the color temperature, the color, the brightness or a combination thereof over time.

16. The lamp system according to claim 15, wherein
the frame portion comprises a first inclined surface portion surrounding an edge of the light-emitting plate, and the second light-emitting surface is located on the first inclined surface portion.

17. The lamp system according to claim 16, wherein
the first inclined surface portion is inclined towards the back plate relative to the light-emitting plate at an edge of the light-emitting plate, and when adjacent lamp units are spliced by means of the connection ports and the connectors, two adjacent first inclined surface portions on the adjacent lamp units form a V-shaped groove.

* * * * *